(No Model.)
W. A. FARR.
TENSION DEVICE FOR USE IN MAKING FENCES.
No. 382,464. Patented May 8, 1888.
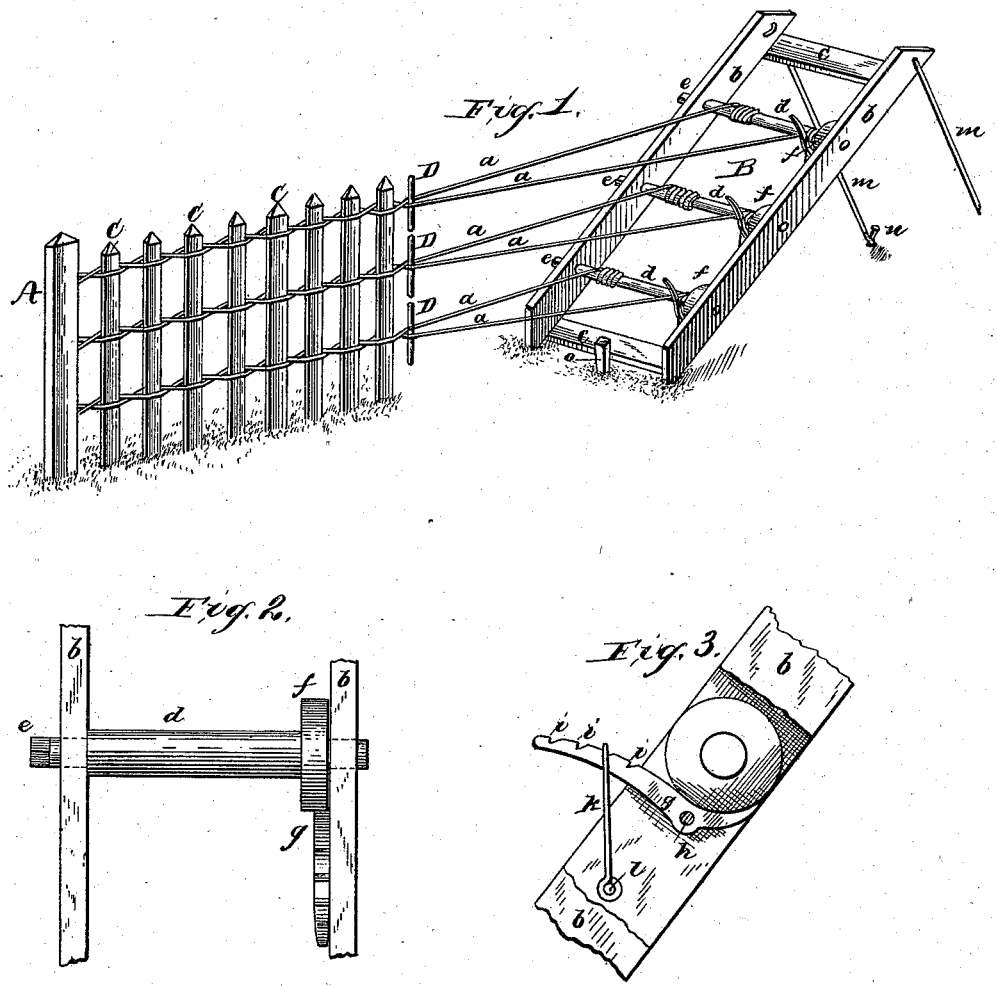
Witnesses.  Inventor.

UNITED STATES PATENT OFFICE.

WILLIAM A. FARR, OF EAST CARMEL, OHIO.

TENSION DEVICE FOR USE IN MAKING FENCES.

SPECIFICATION forming part of Letters Patent No. 382,464, dated May 8, 1888.

Application filed January 24, 1888. Serial No. 261,782. (No model.)

*To all whom it may concern:*

Be it known that I, WILLIAM A. FARR, a citizen of the United States, residing at East Carmel, in the county of Columbiana and State of Ohio, have invented certain new and useful Improvements in Devices for Use in Making Fences; and I do hereby declare the following to be a full, clear, and exact description of the invention, such as will enable others skilled in the art to which it appertains to make and use the same.

My invention relates to machines for weaving picket-and-wire fences, and has for its object the construction of a cheap, simple, and effective device for making fences in the field.

In weaving the pickets into the wire the wire is frequently broken, for the reason that the pickets take up the wire and produce sufficient strain upon it to cause it to break. I overcome this difficulty by producing a device for paying out the wire as it is required without slacking it so as to sag and form irregular lines on the pickets.

The invention will be hereinafter described, and particularly pointed out in the claim.

In the accompanying drawings, which form a part of this specification, Figure 1 represents a perspective view. Fig. 2 is a detail plan of one of the reels, and Fig. 3 is a detail showing the application of a brake for controlling the tension of the wires.

Reference being had to the drawings and the letters marked thereon, A represents a post, to which one end of the wires *a a* is attached.

B is a frame, made of two side pieces, *b b*, which are connected by cross-bars *c c*, and between which are mounted a series of reels, *d*, one end of which projects through the side piece, *b*, and is provided with a square portion, *e*, to receive the eye of a suitable wrench or crank for turning the reels to wind wire thereon. On each of the reels *d* is formed a hub, *f*, adjacent to one of the side pieces, *b*, to which is secured a series of brake-levers, *g*, corresponding in number with the hubs *f*, and bear upon the periphery of the hubs. The levers *g* are fulcrumed at *h*, and the long arm thereof is provided with notches *i*, with which one end of the link *k* engages, while the opposite end of the link is secured to the side *b* of the frame at *l*. To the upper end of each side *b* of the frame is attached a rod, *m*, the lower end of which is provided with an eye or loop to receive a pin, *n*, which is driven through said eye into the ground to brace the frame B when in working position.

C represents the pickets, which are woven into the wires *a a* by twisting the wires, in a well-known manner, by means of a bar, D, or other suitable device.

Any desired number of reels may be mounted in the frame B and the tension of the wire regulated by increasing or diminishing the pressure of the short end of the lever *g* against the periphery of the hub *f*.

The operation of constructing a fence is as follows: The post A having been set and secured in the ground, one end of the strands or lines *a a* is secured thereto in any approved manner. The frame B is then inclined rearwardly, as shown in Fig. 1, and secured in said position by pins or stakes *n* and *o*, driven into the ground in front and back of the frame B, respectively, the former passing through an eye or loop in the lower end of rod *m*, secured to the top of frame B, and the latter located at the front end of the frame to afford a brace or stop for the lower end thereof. The strands of wire *a a* are drawn taut by turning the reels *d*, and are then overlapped or crossed back and forth in the usual manner of weaving pickets into wire and the pickets C inserted. As the wire is taken up by the pickets inserted, more wire is paid out from the reels *d*, the tension being regulated by the brake-levers *g* and the wires kept stretched, so that they will be applied to the pickets in equidistant horizontal lines.

The device is simple in construction, can be easily and readily manipulated, and built at very small cost.

Having thus fully described my invention, what I claim is—

The frame B, having a series of reels mounted therein, provided with hubs adjacent to one side of the frame, in combination with levers attached to the frame and one end thereof bearing upon the hubs, and links for securing the levers, substantially as described.

In testimony whereof I affix my signature in presence of two witnesses.

WILLIAM A. FARR.

Witnesses:
 JOHN T. VALE,
 ELI C. VALE.